United States Patent
Kavarana

(10) Patent No.: US 11,524,685 B2
(45) Date of Patent: Dec. 13, 2022

(54) SYSTEM AND METHOD FOR REDUCING DRIVER AWARENESS OF ENGINE STOPPAGE BY A VEHICLE

(71) Applicant: Nissan North America, Inc., Franklin, TN (US)

(72) Inventor: Farokh Kavarana, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 14 days.

(21) Appl. No.: 17/038,925

(22) Filed: Sep. 30, 2020

(65) Prior Publication Data

US 2022/0097703 A1    Mar. 31, 2022

(51) Int. Cl.
  *B60W 30/18* (2012.01)
  *B60W 10/30* (2006.01)
  *B60W 10/06* (2006.01)
  *F02D 41/04* (2006.01)

(52) U.S. Cl.
  CPC ...... *B60W 30/18018* (2013.01); *B60W 10/06* (2013.01); *B60W 10/30* (2013.01); *F02D 41/042* (2013.01)

(58) Field of Classification Search
  CPC . B60W 30/18018; B60W 10/06; B60W 10/30
  See application file for complete search history.

(56) References Cited

U.S. PATENT DOCUMENTS

| | | | |
|---|---|---|---|
| 1,675,685 A * | 7/1928 | Andrade | B60N 2/3013 296/66 |
| 9,347,388 B2 * | 5/2016 | Bohn | F02D 29/02 |
| 9,686,611 B2 * | 6/2017 | Violi | B60Q 5/00 |
| 9,981,617 B1 * | 5/2018 | MacDonald | F02D 11/105 |
| 10,133,535 B2 * | 11/2018 | Pietila | G06F 3/16 |
| 10,452,257 B2 * | 10/2019 | Kim | H03K 17/962 |
| 2007/0088560 A1 * | 4/2007 | Mock | H04M 1/72439 340/539.13 |
| 2010/0037814 A1 * | 2/2010 | Sahr | B63B 29/04 114/363 |
| 2016/0318523 A1 * | 11/2016 | Kim | F02N 11/0837 |
| 2017/0320480 A1 * | 11/2017 | Ye | B60W 10/06 |
| 2018/0232196 A1 * | 8/2018 | Pietila | F02D 41/3005 |
| 2020/0055513 A1 * | 2/2020 | Galang | B60W 50/14 |
| 2021/0206364 A1 * | 7/2021 | Hadj Said | B60N 2/0244 |

* cited by examiner

*Primary Examiner* — Carl C Staubach

(74) *Attorney, Agent, or Firm* — Global IP Counselors, LLP

(57) ABSTRACT

Systems and methods for reducing driver awareness of engine stoppage by a vehicle are disclosed herein. In an embodiment, the system includes a stop-start mechanism in communication with an engine operable to cause movement of the vehicle, the stop-start mechanism programmed to shut off the engine at a beginning of a nonoperational period and restart the engine at an end of the nonoperational period. The system also includes a vibration device triggered to cause at least one vehicle component to vibrate when the stop-start mechanism shuts off the engine at the beginning of the nonoperational period, and triggered to cease causing the at least one vehicle component to vibrate when the stop-start mechanism restarts the engine at the end of the nonoperational period.

22 Claims, 3 Drawing Sheets

SYSTEM AND METHOD FOR REDUCING DRIVER AWARENESS OF ENGINE STOPPAGE BY A VEHICLE

BACKGROUND

Field of the Disclosure

The present disclosure generally relates to a system and a method for reducing driver awareness of engine stoppage by a vehicle. More specifically, the present disclosure relates to a system and a method which cause at least one vehicle component to vibrate for the purpose of replicating the vibrations and/or noise caused when the engine is idling.

Background Information

Idle stop-start systems ("ISS systems") are currently used to shut down and then restart a vehicle's engine during idle periods, for example, while the vehicle is waiting at a traffic light or stuck in a traffic jam. Although current ISS systems effectively address emission mandates and result in significant fuel savings, many drivers have rejected the technology due to the clear difference in vibration and noise levels when the engine is shut down and then restarted. To address this customer complaint, many vehicle manufacturers offer the option to turn off an ISS system and forgo the significant environmental and cost-saving benefits.

SUMMARY

One object of the present disclosure is to provide systems and methods that reduce driver awareness of engine stoppage by a vehicle, for example, by using a vibration device to replicate the vibration and noise levels caused when the engine is idling. In doing so, the disclosed systems and methods allow vehicles to reap the benefits of an ISS system such as fuel efficiency and reduced emissions, but without experiencing the sudden changes in vibration and noise levels which bother many drivers.

In view of the state of the known technology, one aspect of the present disclosure is to provide a system for reducing driver awareness of engine stoppage by a vehicle. The system includes a stop-start mechanism in communication with an engine operable to cause movement of the vehicle, the stop-start mechanism programmed to shut off the engine at a beginning of a nonoperational period and restart the engine at an end of the nonoperational period. The system also includes a vibration device triggered to cause at least one vehicle component to vibrate when the stop-start mechanism shuts off the engine at the beginning of the nonoperational period, and triggered to cease causing the at least one vehicle component to vibrate when the stop-start mechanism restarts the engine at the end of the nonoperational period.

Another aspect of the present disclosure is to provide another system for reducing driver awareness of engine stoppage by a vehicle. The system includes a vibration device operable to cause at least one vehicle component to vibrate during nonoperation of the vehicle's engine. The system also includes a controller programmed to (i) cause the vibration device to begin vibrating the at least one vehicle component at a beginning of a nonoperational period of the engine, and (ii) cause the vibration device to cease vibrating the at least one vehicle component at an end of the nonoperational period of the engine.

Another aspect of the present disclosure is to provide a method for reducing driver awareness of engine stoppage by a vehicle. The method includes receiving a first signal that the vehicle's engine has been stopped, causing a vibration device to vibrate at least one vehicle component upon reception of the first signal, receiving a second signal that the vehicle's engine has been restarted, and causing the vibration device to cease vibrating the at least one vehicle component upon reception of the second signal.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
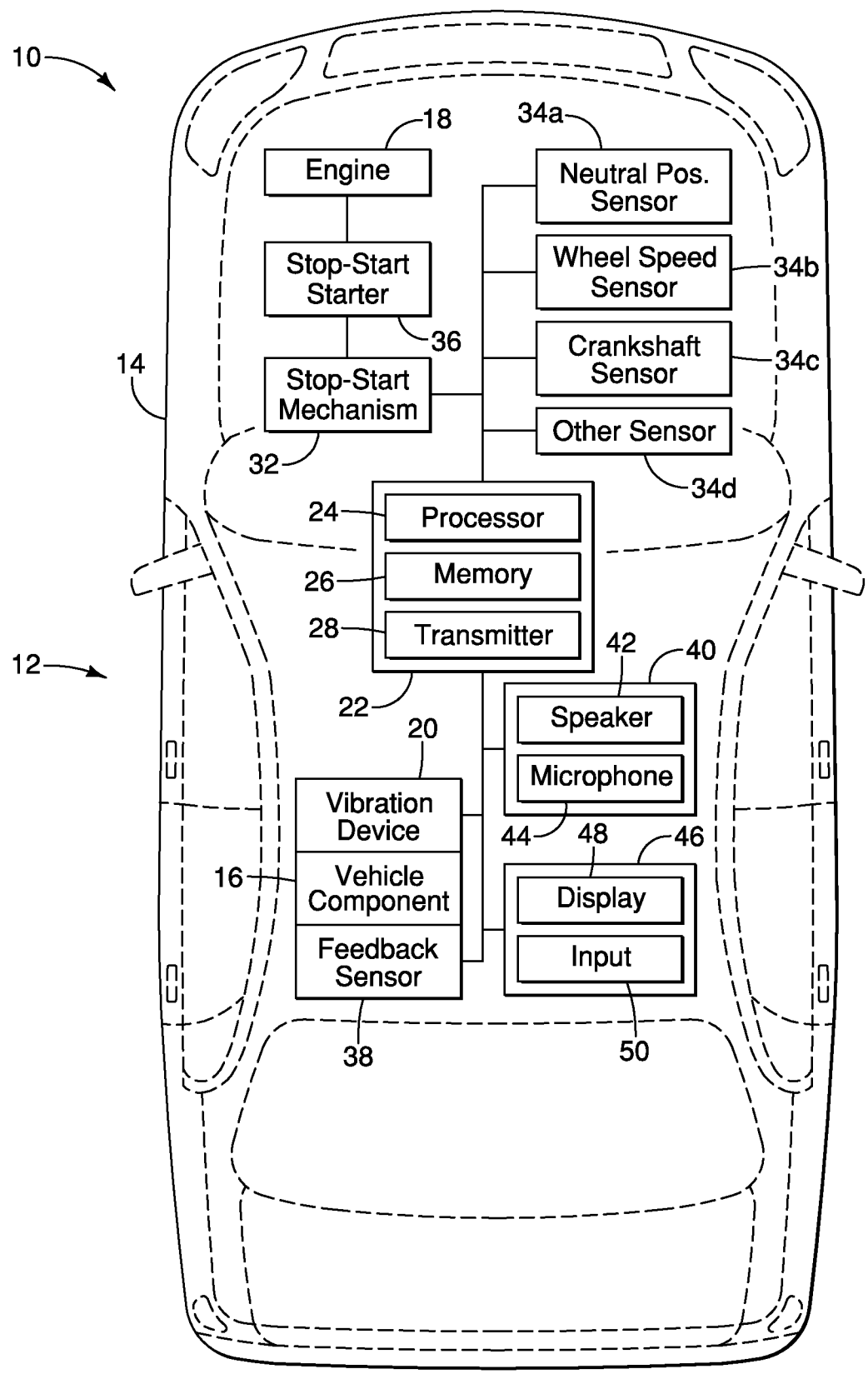
FIG. 1 is a schematic diagram of an example embodiment of a system for reducing driver awareness of engine stoppage by a vehicle in accordance with the present disclosure.
Figure 2:
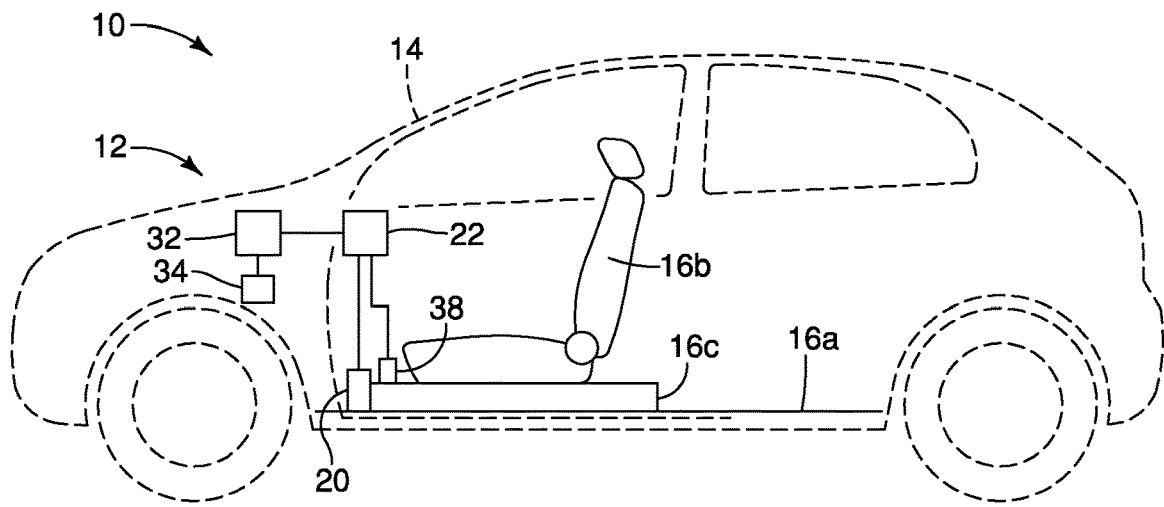
FIG. 2 is another a schematic diagram of the system of FIG. 1.

FIGS. 1 and 2 illustrate an example embodiment of a system 10 for reducing driver awareness of engine stoppage by a vehicle 12. The system 10 can include the vehicle 12 or be located on or within the vehicle 12. In various embodiments, the system 10 can be implemented in a vehicle 12 at the time of manufacture of the vehicle 12, can be incorporated into or added onto an existing ISS system, or can be added to a vehicle 12 without an existing ISS system.

The vehicle 12 can include a vehicle body 14. Within the vehicle body 14, the vehicle 12 includes a plurality of vehicle components 16 and an engine 18. As used herein, a "vehicle component" can refer to any part, group of parts, system, subsystem and/or the like that experiences vibration and/or resulting noise levels perceptible to the driver of the vehicle 12 during operation of the engine 18. For example, as shown in FIG. 2, some vehicle components 16 which experience vibration and/or noise levels during operation of the engine 18 include the vehicle's floor 16a, one or more of the vehicle's seats 16b, and/or one or more of the vehicle's seat tracks 16c.

The engine 18 is operable to cause movement of the vehicle 12. The engine 18 can be any engine known in the art which can be shut off and restarted during periods of nonoperation. For example, the engine 18 can be an internal combustion engine, an electrical engine, or any other engine known in the art and operable to cause movement of the vehicle 12. As used herein, a "nonoperational period" or "period of nonoperation" of the engine 18 can refer to a period beginning when the engine 18 shuts off (e.g., while stopped at a traffic light or sitting in a traffic jam) and ending when the engine 18 restarts (e.g., when the driver attempts to accelerate after being stopped at the traffic light or stuck in the traffic jam). Likewise, an "operational period" or "period of operation" can refer to a period when the engine 18 is running (e.g., when the vehicle 12 is moving or ready to move without restarting the engine 18). An "idling period" can refer to a period when the engine 18 is operating but the vehicle 12 is not moving (e.g., when the engine 18 is idling at a stop). Thus, as used herein, an operational period can include an idling period.

The system 10 can include a vibration device 20 and a controller 22. In an embodiment, the vibration device 20 and the controller 22 can be parts of the vehicle 12 which also accomplish other tasks related to use of the vehicle 12. For example, some vehicles 12 include haptic shakers in or on steering wheels or seats which can be utilized as a vibration device 20 according to the present disclosure. Likewise, most vehicles also have a central control unit which can be utilized as a controller 22 according to the present disclosure. Alternatively, the vibration device 20 and the controller 22 can be separate parts which function solely in accordance with the system 10 discussed herein.

The vibration device 20 can be operable to cause at least one vehicle component 16 to vibrate during nonoperation of the engine 18. The vibration device 20 can further be operable to cause a noise during nonoperation of the engine 18. The noise can be caused by the vibration device 20 itself, or by the sound of the at least one vehicle component 16 vibrating due to operation of the vibration device 20. It has been determined that much of the noise experienced by a driver when an engine 18 is running is structure-borne noise due to vibrations and not the sound of the engine 18 itself.

The vibration device 20 can include a haptic shaker, for example, a piezoelectric shaker or an electrodynamic shaker. The vibration device 20 can further be mounted on or adjacent to the at least one vehicle component 16 intended to be vibrated. The vibration device 20 can be mounted directly to the at least one vehicle component 16 intended to be vibrated, or can be mounted to an intervening component which will translate the vibrations from the vibration device 20 to the at least one vehicle component 16. In an embodiment, the vibration device 20 can be mounted on or adjacent to at least one of a vehicle floor 16a, a vehicle seat 16b, and/or a vehicle seat track 16c. In FIG. 2, an example embodiment of a vibration device 20 is mounted against a vehicle floor 16a and/or a vehicle seat track 16c, thus allowing the vibration device 20 to directly vibrate the vehicle floor 16a and/or the vehicle seat track 16c. In this example, the vibration device 20 also indirectly vibrates the vehicle seat 16b, for example, due to the attachment of the vehicle seat track 16c to the vehicle seat 16b.

In an embodiment, the system 10 can include a plurality of vibrations devices 20 configured to vibrate during non-operation of the engine 18. For example, a vibration device 20 can be attached to each vehicle seat 16b and/or each vehicle seat track 16c. Those of ordinary skill in the art will recognize from this disclosure that differently configured vehicles 12 can require different numbers of vibrations devices 20 and/or different locations for the vibration devices 20 to effectively replicate the vibration and/or noise levels specific to that vehicle 12.

The vibration device 20 can be configured to be adjusted to operate at a plurality of different frequencies (e.g. at different cycles per second (Hertz)) based on a received vibration signal. In an embodiment, the vibration signal can be a signal from the controller 22. In an embodiment, the vibration signal can include, for example, a current or voltage which causes the vibration device 20 to operate at one of the plurality of different frequencies. In another embodiment, the vibration signal can include instructions to be processed by the voltage device 20 which cause the voltage device 20 to operate at one of the plurality of different frequencies.

The controller 22 can include one or more of a processor 24, a memory 26, and a data transmission device 28. The processor 24 is configured to execute instructions programmed into and/or stored by the memory 26. As described in more detail below, many of the steps of the methods described herein can be stored as instructions in the memory 26 and executed by the processor 24. The memory 26 can include, for example, a non-transitory storage medium. The data transmission device 28 can enable the controller to communicate with and/or control the other elements of the vehicle 12 which are discussed herein, and can further enable communication with a source outside of the vehicle 12 for the purpose of receiving instructions to be stored on the memory 26 and processed by the processor 24. The data transmission device 28 can include, for example, a transmitter and a receiver configured to send and receive wired or wireless signals in accordance with methods known in the art. For example, the data transmission device 28 can be configured for short-range wireless communication, such as Bluetooth communication, and/or for communication over a wireless network.

In an embodiment explained in more detail below, the controller 22 can receive a first signal when the engine 18 is shut down, and the controller 22 can then cause the vibration device 20 to begin vibrating the at least one vehicle component 16 upon reception of the first signal. More specifically, the controller 22 can automatically cause the vibration device 20 to begin vibrating upon reception of the first signal. The controller 22 can also receive a second signal when the engine 18 is restarted, and the controller 22 can then cause the vibration device 20 to cease vibrating the at least one vehicle component 16 upon reception of the second signal. More specifically, the controller 22 can automatically cause the vibration device 20 to cease vibrating upon reception of the second signal. The first signal and the second signal can be different signals or can be indicated by the same signal. In an embodiment, the first signal and the second signal can be indicated by a continuous stoppage signal during a nonoperational period of the engine 18, with the first signal indicated by the beginning of the continuous stoppage signal and the second signal indicated by the end of the continuous stoppage signal (e.g., the controller 22 can operate the vibration device 20 when receiving the continuous stoppage signal). Alternatively, the first signal and the second signal can be indicated by a continuous operation signal during an operational period of the engine 18, with the first signal indicated by the end of the continuous operation signal and the second signal indicated by the beginning of the next continuous operation signal (e.g., the controller 22 can operate the vibration device 20 when not receiving the continuous operation signal).

In an embodiment, the controller 22 can be or include a signal generator or amplifier (hereinafter a "signal generator") which is used to generate or amplify the vibration signal that controls the vibration and/or noise levels of the vibration device 20. The controller 22, as a signal generator, can be used to control the vibration device 20 based on at least one signal received regarding the engine 18 being shut down and/or restarted. For example, when the controller 22 receives the first signal regarding shutdown of the engine 18, the controller 22 can generate a vibration signal to activate the vibration device 20 at one of the plurality of different frequencies. Then, when the controller 22 receives the second signal regarding restart of the engine 18, the controller 22 can deactivate the vibration device 20. The controller 22 can further generate a new vibration signal or adjust a current vibration signal to cause the vibration device 20 to adjust to different frequencies of the plurality of different frequencies.

The system 10 can further include a stop-start mechanism 32. The stop-start mechanism 32 can be an existing ISS system in the vehicle 12 which becomes part of the system 10 when modified and/or used as described herein, or the stop-start mechanism 32 can be a separate mechanism added to the vehicle 12 in accordance with the present disclosure. The stop-start mechanism 32 can include its own controller which is in communication with the controller 22 discussed herein, or the controller 22 discussed herein can also be included within or control the stop-start mechanism 32. In an embodiment, the stop-start mechanism 32 can be controlled by the controller 22 in accordance with instructions stored on the memory 26 and executed by the processor 24.

In an embodiment, the stop-start mechanism 32 can be placed in communication with the engine 18 and/or the controller 22. In use, the stop-start mechanism 32 can be programmed to shut off the engine 18 at a beginning of a nonoperational period, and to restart the engine 18 at an end of the nonoperational period. The stop-start mechanism 32 can be placed in direct or indirect communication with the vibration device 20, such that the vibration device 20 can be triggered to cause at least one vehicle component 16 to vibrate when the stop-start mechanism 32 shuts off the engine 18 at the beginning of a nonoperational period, and triggered to cease causing the at least one vehicle component 16 to vibrate when the stop-start mechanism 32 restarts the engine 18 at the end of the nonoperational period. To do so, for example, the stop-start mechanism 32 can generate the first signal upon shutdown of the engine 18 at the beginning of a nonoperational period, and the stop-start mechanism 32 can generate the second signal upon restart of the engine 18 at the end of the nonoperational period. In an embodiment, the stop-start mechanism 32 can generate a vibration signal and/or communicate directly with the vibration device 20.

The stop-start mechanism 32 can include one or more sensor 34 and a stop-start starter 36. Alternatively, the vehicle 12 can include one or more sensor 34 and a stop-start starter 36 without these elements considered to be part of the stop-start mechanism 32. In use, based on one or more signal from the one or more sensor 34, the stop-start starter 36 can be used to shut off the engine 18 at the beginning of a nonoperational period and to restart the engine 18 at the end of the nonoperational period.

The one or more sensor 34 can include a neutral position sensor 34a, a wheel speed sensor 34b, a crankshaft sensor 34c, and/or another sensor 34d. The neutral position sensor 34a can be configured to detect when the transmission of the engine 18 has been placed in neutral, for example, by monitoring the gear-level position inside the transmission. The wheel speed sensor 34b can be configured to detect when the wheels of the vehicle 12 have stopped moving, for example, by monitoring the rotation of the wheels and/or the speed of the rotation of the wheels. The crankshaft sensor 34c can be configured to detect when the crankshaft of the vehicle 12 has slowed down or stopped moving, for example, by monitoring the positional or rotational speed of the crankshaft. Using one or more of these sensors 32, the controller 22 and/or the stop-start mechanism 32 can determine when a vehicle has stopped, for example, at a traffic light or in a traffic jam. Those of ordinary skill in the art will recognize from this disclosure that additional or different sensors can also be used for the same purpose.

In an embodiment, the one or more sensor 34 can generate the first signal and/or the second signal. More specifically, the one or more sensor 34 can detect an engine shutdown condition and/or an engine restart condition and generate the first and/or second signals upon detection. In an embodiment, the one or more sensor 34 can generate a vibration signal and/or communicate directly with the vibration device 20.

The stop-start starter 36 can be configured to shut down the engine 18 upon detection of an engine shutdown condition and/or restart the engine 18 upon detection of an engine restart condition. An engine shutdown condition can occur, for example, when one or more sensor 32 has determined that the vehicle 12 is stopped, for example, at a traffic light or in a traffic jam. An engine restart condition can occur, for example, when a driver presses on a gas pedal after the engine 18 has been shut down. The controller 22 and/or the stop-start mechanism 32 can determine the presence of an engine shutdown condition and/or an engine restart condition and control the stop-start starter 36 based thereon.

The system 10 can further include at least one feedback sensor 38. The feedback sensor 38 can be configured, for example, to detect the frequency of the vibrations of at least one vehicle component 16 during an idling period so that the frequency can be replicated using the vibration device 20 during a nonoperational period. The feedback sensor 38 can also be configured, for example, to detect the frequency of the vibrations of at least one vehicle component 16 during a nonoperational period so that the frequency of the vibration device 20 can be adjusted to a desired frequency which more accurately reflects the vibrations during the idling period. The feedback sensor 38 can include, for example, an accelerometer. Feedback and adjustments using the feedback sensor 38 are discussed in more detail with reference to the methods discussed below.

The system 10 can further include an audio device 40 configured to supplement the noise and/or noise levels caused by the vibration device 20 by using artificial sound enhancement technology during a nonoperational period. The audio device 40 can also be used to replicate the noise and/or noise levels caused by the engine 18 during an idling period, with or without simultaneous use of the vibration device 20. The audio device 40 can include, for example, a speaker 42 and a microphone 44. The speaker 42 can be operable to emit noise and/or adjust noise levels within the vehicle 12. The microphone 44 can be operable to record and/or detect a noise and/or noise level within the vehicle 12. In an embodiment, a speaker 42 and a microphone 44 already located within a vehicle 12 can be utilized as the speaker 42 and the microphone 44 discussed herein. As described in more detail below, the controller 22 can be programmed to cause the audio device 40 to emit a sound (e.g., noise and/or noise levels) while the vibration device 20 vibrates the at least one vehicle component 16 during a nonoperational period of the engine 18.

The system 10 can further include a user interface 46 configured to enable a driver to initiate, adjust and/or calibrate the system 10. The user interface 46 can include one or more of a display 48 and an input device 50. In an embodiment, the display 48 and the input device 50 can be part of a graphical user interface 46 such as a touch screen which enables a driver to input and view information regarding various aspects of the vehicle 12. In an embodiment, a user interface 46 already located within a vehicle 12 and used for other purposes can be utilized as the user interface 46 discussed herein.

The system 10 can function in various ways, for example, as an open-loop system, as a load-based system, and/or as a closed-loop system. Each of these embodiments is briefly described herein. In each of these embodiments, the process can begin with a transfer function which determines the ratio of the output of at least one vehicle component 16 and/or the vibration device 20 (e.g., the tactile response of a vehicle component 16) to the input to the vibration device 20 (e.g., the vibration signal causing vibration of the vibration device 20). The transfer function can be predetermined based on a similar vehicle 12, or can be determined by measuring the output of at least one vehicle component 16 and/or the vibration device 20 utilizing the system 10.

In a first embodiment in which the system 10 functions as an open-loop system, the controller 22 can control the vibration device 20 based on the transfer function and without feedback. In this embodiment, the vibration device 20 outputs a single pattern of vibrations based on the transfer function each time the vehicle 12 enters a nonoperational period. Feedback and other factors do not affect the output of the vibration device 20. Thus, the open-loop system is a simple and low-cost system which does not require the feedback sensor 38 or other feedback controls.

In a second embodiment in which the system 10 functions as a load-based system, the controller 22 can control the vibration device 20 by selecting from a predetermined plurality of different frequencies. In this embodiment, the controller 22 selects one of the predetermined frequencies based on one or more usage condition of the vehicle 12 (e.g., AC on/off, lamps on/off, other accessories on/off, etc.) which affects the engine load. For example, an accessory (e.g., the AC) being turned on will trigger a first frequency of the plurality of different frequencies, while the accessory (e.g., the AC) being turned off will trigger a second frequency of the plurality of different frequencies. Thus, in this embodiment, the controller 22 determines which accessories are active and/or the level of activity and then selects one of the plurality of different frequencies based on that determination. Here, the feedback utilized by the controller 22 relates to the accessories affecting the engine load, and thus the load-based system does not require the feedback sensor 38. The plurality of different frequencies can be determined, for example, by developing transfer functions for each of the different states which generate different frequencies.

In a third embodiment in which the system 10 functions as a closed-loop system, the controller 22 can control the vibration device 20 based on feedback from the feedback sensor 38. In this embodiment, the controller 22 can adjust the output of the vibration device 20 in real time and maintain the adjusted level, for example, based on prior knowledge of the transfer function. This embodiment is advantageous, for example, because it accounts for variations from vehicle to vehicle.

Figure 3:
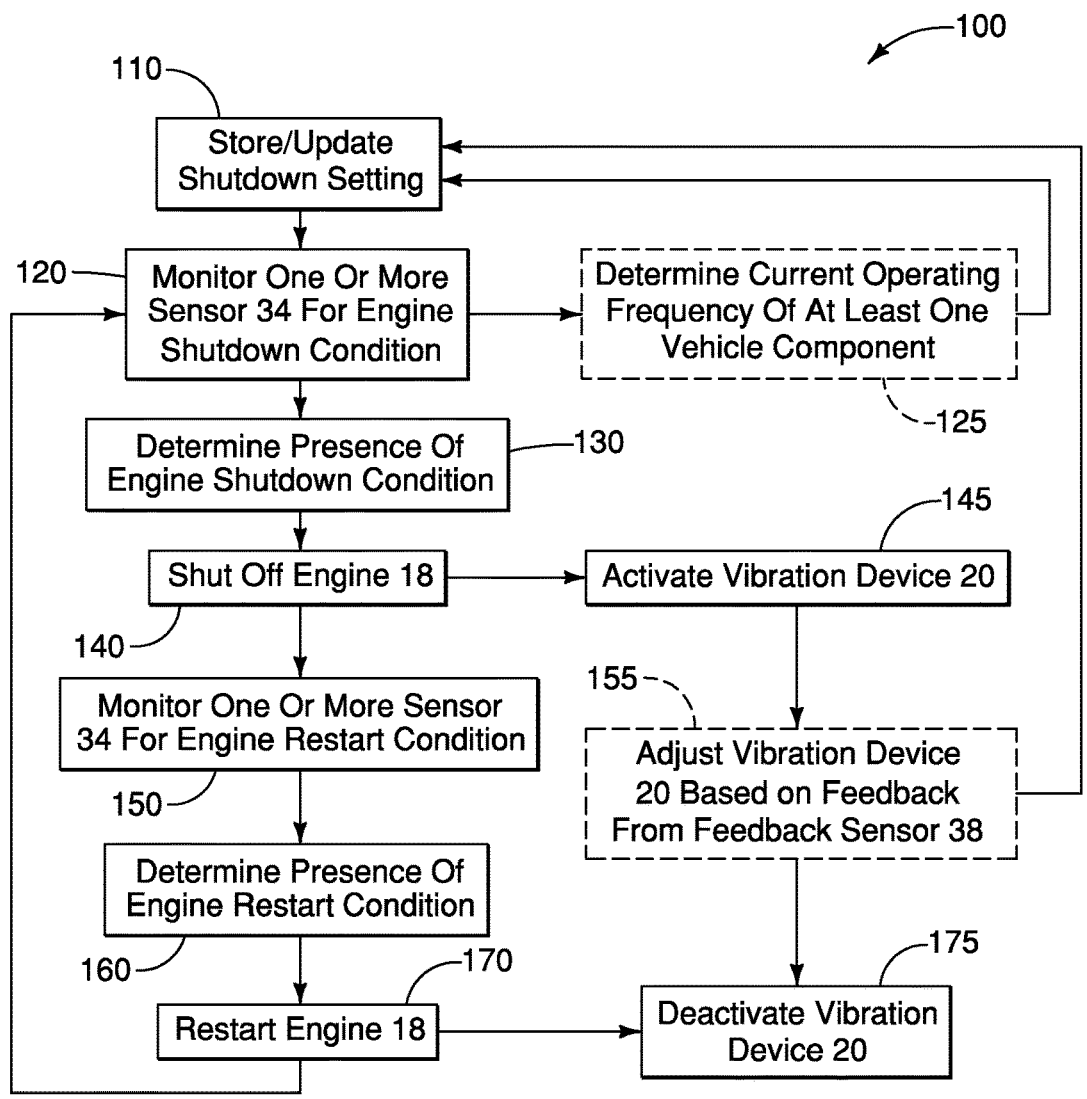
FIG. 3 illustrates an example embodiment of a method for reducing driver awareness of engine stoppage by a vehicle which can be implemented using the system of FIGS. 1 and 2.

FIG. 3 illustrates an example embodiment of a method 100 for reducing driver awareness of engine stoppage by a vehicle 12. Some or all of the steps of method 100 can be implemented by the controller 22 using instructions stored on the memory 26 and executed by the processor 24. It should be understood from this disclosure that some of the steps described herein can be reordered or omitted without departing from the spirit or scope of method 100. For example, if the system 10 is operating as an open-loop or load-based system, then the steps in method 100 which involve the feedback sensor 38 can be optionally omitted.

Beginning at step 110, the controller 22 can store at least one shutdown setting in the memory 26. The shutdown setting can include one or more frequency to be utilized during a nonoperational period, which can be based on one or more predetermined transfer function. For example, the shutdown setting can include a component frequency at which the at least one vehicle component 16 is expected to vibrate during an idling period. Additionally or alternatively, the shutdown setting can include a device frequency at which the vibration device 20 should operate during a nonoperational period. The device frequency can be the same as or different than the component frequency. It should be understood from this disclosure that various factors may dampen the vibrations of the vibration device 20 during use, so in various embodiments the device frequency may need to be set differently from the component frequency to achieve the component frequency during the nonoperational period.

In an embodiment, the system 10 can perform a calibration at step 110, for example, to account for dampening effects. During the calibration, the system 10 can utilize the feedback sensor 38 to measure the frequency of the vibrations of the at least one vehicle component 16 while the engine 18 is idling during an idling period. The system 10 can then shut down the engine 18, activate the vibration device 20, and utilize the feedback sensor 38 to measure the frequency of the vibrations of the at least one vehicle component 16 during this nonoperational period of the engine 18. If the measured frequency during the idling period does not approximately match the measured frequency during the nonoperational period, then the controller 22 can adjust the output of the vibration device 20 until the frequencies approximately match. The final setting of the vibration device 20 once the frequencies approximately match can then be saved as a shutdown setting.

In an embodiment, the shutdown setting can be an initial shutdown setting including a predetermined frequency intended to approximately match an idling frequency at which the at least one vehicle component 16 and/or vibration device 20 is expected to vibrate during an idling period. For example, the predetermined frequency can be based on a transfer function determined from a measured idling frequency of a similar vehicle component 16 and/or the vibration device 20 measured in another vehicle 12.

In an embodiment, the predetermined frequency can set the vibration device 20 at the same frequency as the engine 18 while idling. For example, the predetermined frequency can be based on the number of cylinders of the engine 18, for example, with the shutdown setting placing the vibration device 20 at the same frequency as the firing frequency of the cylinders of the engine 18.

In an embodiment, the shutdown setting can be an adjusted shutdown setting including an adjusted frequency based on a current idling frequency at which the at least one vehicle component 16 and/or the vibration device 20 is currently operating at during an idling period. For example, the feedback sensor 38 can measure the vibrations of the at least one vehicle component 16 and/or the vibration device 20 during an idling period, and the frequency of those vibrations can be saved as the current idling frequency.

The shutdown setting can change each time the vehicle 12 is driven, or the shutdown setting can change multiple times during a single trip with the vehicle 12. In an embodiment, a plurality of shutdown settings can be saved by the memory 26, and the controller 22 can automatically select the appropriate shutdown setting each time method 100 is performed. The appropriate shutdown setting can be a most recent shutdown setting, or can be a setting based on a configuration of the vehicle 12 and/or a vehicle component 16. For example, if the vibration device 20 is attached to a vehicle seat 16b or vehicle seat track 16c, then the vibration level may change depending on the configuration of the vehicle seat 16b. Thus, in an embodiment, the controller 22 can automatically select an initial shutdown setting based on the configuration of the vehicle seat 16b each time a driver adjusts the vehicle seat 16b. Those of ordinary skill in the art will recognize from this disclosure, however, that this is an example only and there are other factors besides the position of a vehicle seat 16b that can affect vibration and/or noise levels caused by the system 10 discussed herein.

At step 120, the controller 22 and/or the stop-start mechanism 32 can monitor the one or more sensor 34 for the detection of an engine shutdown condition. An engine shutdown condition can be any condition which indicates that the engine 18 has entered an idling period and can be shut down (e.g., an indication that the vehicle 12 has stopped at a traffic light or become stuck in a traffic jam). For example, an engine shutdown condition can include one or more of a detection by the neutral position sensor 34a that the transmission of the engine 18 has been placed in neutral, a detection by the wheel speed sensor 34b that the wheels of the vehicle 12 have stopped moving, a detection by the crankshaft sensor 34c that the vehicle 12 has stopped moving, and/or a detection by another sensor 34d. Those of ordinary skill in the art will recognize from this disclosure that additional or different sensors and/or detections can also be used for the same purpose.

Optionally, at step 125, which can occur simultaneously with step 120, the controller 22 and/or the stop-start mechanism 32 can utilize feedback from the feedback sensor 38 to adjust one or more shutdown setting stored by the memory 26 at step 110. For example, the feedback sensor 38 can measure the current idling frequency of the at least one vehicle component 16 and/or the vibration device 20 during an idling period (e.g., the frequency of the vibrations of the at least one vehicle component 16 and/or the vibration device 20 during the idling period). If the current idling frequency during the idling period differs from the idling frequency stored as a shutdown setting by the memory 26, then the current idling frequency can be saved as a new shutdown setting. This way, the system 10 can maintain up-to-date settings and accordingly minimize driver awareness of engine stoppage as much as possible. For various reasons, the current idling frequency can change under different conditions throughout use of the vehicle 12.

At step 130, one or more sensor 34 has detected an engine shutdown condition. In an embodiment, the engine shutdown condition only needs to be detected by one sensor 34 to initiate step 140 of the method 100. Alternatively, step 130 can require that a plurality of sensors 34 detect an engine shutdown condition to ensure that the sensors 34 are functioning properly.

At step 140, the controller 22 and/or the stop-start mechanism 32 can cause the engine 18 to shut down, marking the beginning of a nonoperational period for the engine 18. The controller 22 and/or the stop start mechanism 32 can cause the engine 18 to shut down, for example, by triggering the stop-start starter 36 to shut down the engine 18.

At step 145, the controller 22 and/or the stop-start mechanism 32 can trigger the vibration device 20 to begin vibrating the at least one vehicle component 16 at the shutdown setting stored at step 110. The vibration device 20 can be triggered simultaneously with the shutdown of the engine 18 at step 140, or after a short delay following the shutdown of the engine 18 at step 140. Ideally, the vibration device 20 is triggered at an appropriate time so that the driver does not notice the transition from the engine 18 causing the vibrations to the vibration device 20 causing the vibrations.

In an embodiment, the controller 22 receives a first signal when the engine 18 is shut down at step 140, and the controller 22 then causes the vibration device 20 at step 145 to begin vibrating the at least one vehicle component 16 upon reception of the first signal. The first signal can be sent from the stop-start mechanism 32 to the controller 22 to indicate that an engine 18 shutdown has occurred. The first signal can also be sent from one or more sensor 34 to the controller 22 to indicate that an engine 18 shutdown has occurred. The controller 22 can automatically initiate step 145 upon reception of the first signal.

In an embodiment, the controller 22 can activate the vibration device 20 by generating a vibration signal which will cause the vibration device 20 to vibrate the at least one vehicle component 16 at the idling frequency saved as the shutdown setting at step 110. For example, the controller 22 can generate a vibration signal which causes the vibration device 20 to operate at an appropriate frequency (e.g., Hertz) such that the at least one vehicle component 16 vibrates at the same frequency during idling and nonoperational periods. In an embodiment, the vibration signal can include, for example, a current or voltage which causes the vibration device 20 to operate at one of a plurality of different frequencies. In another embodiment, the signal can include instructions to be processed by the voltage device 20 which cause the voltage device 20 to operate at one of a plurality of different frequencies.

At step 150, the controller 22 and/or the stop-start mechanism 32 can monitor the one or more sensor 34 for the detection of an engine restart condition. An engine restart condition can be any condition which indicates that the vehicle 12 is ready to move again and the engine 18 should be restarted. For example, an engine restart condition can include a detection by a sensor 34 that an acceleration pedal has been pressed, a detection that the vehicle 12 has shifted out of neutral, and/or any other condition indicating that the vehicle 12 intends to begin moving again. Those of ordinary skill in the art will recognize from this disclosure that additional or different sensors and/or detections can also be used for the same purpose.

Optionally, at step 155, which can occur simultaneously with step 150, the system 10 can utilize feedback from the feedback sensor 38 to adjust the vibration device 20. For example, the feedback sensor 38 can measure the frequency of the vibrations of the at least one vehicle component 16 and/or the vibration device 20 upon activation of the vibration device 20 during a nonoperational period. If the measured frequency detected by the feedback sensor 38 does not approximately match the idling frequency saved as the shutdown setting at step 110 (e.g., the current idling frequency determined at step 125 and saved at step 110), then the controller 22 can cause the vibration device 20 to increase and/or decrease power so that the idling frequency saved as the shutdown setting is approximately matched.

In an embodiment, the controller 22 can operate a closed-loop system at step 155 in which the vibration device 20 is continuously adjusted so that the measured frequency from the feedback sensor 38 approximately matches the idling frequency saved as the shutdown setting. For example, the feedback device 38 can continuously measure the frequency of the at least one vehicle component 16 and/or the vibration device 20 during a nonoperational period. If the measured frequency is less than the idling frequency saved as the shutdown setting, then the controller 22 can cause the vibration device 20 to increase its frequency. For example, the controller 22 can cause the vibration device 20 to incrementally increase its frequency until the measured frequency approximately matches the idling frequency saved as the shutdown setting. If the measured frequency is more than the idling frequency saved as the shutdown setting, then the controller 22 can cause the vibration device 20 to decrease its frequency. For example, the controller 22 can cause the vibration device 20 to incrementally decrease its frequency until the measured frequency approximately matches the idling frequency saved as the shutdown setting.

In another embodiment, the controller 22 can store a table of vibration signals which correspond to different measured frequencies detected by the feedback device 38. Depending on the measured frequency detected by the feedback device 38, the controller 22 can select the appropriate vibration signal and cause the vibration device 20 to change its frequency so as to approximately match the idling frequency saved as the shutdown setting.

In an embodiment, the controller 22 can update one or more shutdown setting stored by the memory 26 at step 110 based on the measured frequency detected by the feedback sensor 38 at step 155.

At step 160, the controller 22 and/or the stop-start mechanism 32 has detected an engine restart condition. In an embodiment, the engine restart condition only needs to be detected by one sensor 34 to initiate step 170 of the method 100. Alternatively, step 160 can require that a plurality of sensors (e.g., an acceleration sensor, a neutral position sensor, etc.) detect an engine restart condition to ensure proper detection.

At step 170, the controller 22 and/or the stop-start mechanism 32 can cause the engine 18 to restart, marking the end of the nonoperational period of the engine 18. The controller 22 and/or the stop start mechanism 32 can cause the engine 18 to restart, for example, by triggering the stop-start starter 36 to restart the engine 18.

At step 175, the controller 22 and/or the stop-start mechanism 32 can trigger the vibration device 20 to cease vibrating the at least one vehicle component 16. The vibration device 20 can be triggered simultaneously with the restart of the engine 18 at step 170, or after a short delay following the restart of the engine 18 at step 170. Ideally, the vibration device 20 is triggered at an appropriate time so that the driver does not notice the transition from the vibration device 20 causing the vibrations to the engine 18 causing the vibrations.

In an embodiment, the controller 22 receives a second signal when the engine 18 is restarted at step 170, and the controller 22 then causes the vibration device 20 at step 175 to cease vibrating the at least one vehicle component 16 upon reception of the second signal. The second signal can be sent from the stop-start mechanism 32 to the controller 22 to indicate that an engine 18 restart has occurred. The second signal can also be sent from one or more sensor 34 to the controller 22 to indicate that an engine 18 restart has occurred. The controller 22 can automatically initiate step 175 upon reception of the second signal.

In an embodiment, the first signal and the second signal can be indicated by a continuous stoppage signal during a nonoperational period of the engine 18. That is, at step 140, the controller 22 can receive a continuous stoppage signal indicating the beginning of a nonoperational period of the engine 18. The controller can then continue to receive the continuous stoppage signal for the entirety of the nonoperational period, until the engine restart condition is detected at step 160 and/or the engine 18 is restarted at step 170. The first signal can be indicated by the beginning of the continuous stoppage signal, and the second signal can be indicated by the end of the continuous stoppage signal. Thus, the controller 22 can initiate step 145 when the controller 22 first receives the continuous stoppage signal, and the controller 22 can initiate step 175 when the continuous stoppage signal ceases (e.g., the controller 22 can operate the vibration device 20 while receiving the continuous stoppage signal).

In an embodiment, the first signal and the second signal can be indicated by a continuous operation signal during an operational period of the engine 18. That is, the controller 22 can receive a continuous operation signal which ceases when the engine 18 is shut down at step 140. The controller 22 then does not receive the continuous operation signal again until the engine restart condition is detected at step 160 and/or the engine 18 is restarted at step 170. The first signal can be indicated by the end of one continuous operation signal, and the second signal can be indicated by the beginning of the next continuous operation signal. Thus, the controller 22 can initiate step 145 when a continuous operation signal ends, and the controller 22 can initiate step 175 when the continuous operation signal begins again (e.g., the controller 22 can operate the vibration device 20 when not receiving the continuous operation signal).

In an embodiment, the controller 22 can deactivate the vibration device 20 by ceasing to send the vibration signal causing the vibration device 20 to vibrate the at least one vehicle component 16.

In an embodiment, the controller 22 can cause the vibration device 20 to continuously vibrate the at least one vehicle component 16 between the beginning and the end of the nonoperational period of the engine 18. More specifically, the controller 22 can cause the vibration device 20 to continuously vibrate the at least one vehicle component 16 with no stoppage of the vibrations between the beginning and the end of the nonoperational period of the engine 18.

Upon restart of the engine 18, the method 100 can return to step 120 and begin to again monitor the engine 18 for the next engine shutdown condition the next time that the vehicle 12 comes to a stop.

With many vehicles 12, the noise experienced by a driver due to operation of the engine 18 can be attributed to the vibrating parts caused by operation of the engine 18. Thus, it is generally not necessary to provide a supplemental sound via the audio device 40 by using artificial sound enhancement technology during a nonoperational period. However, in an additional embodiment, the system 10 can also be configured to supplement the noise caused by the vibrating parts with additional sound via the audio device 40 to even more greatly reduce driver awareness of an engine shutdown.

For example, optionally, at step 110, the shutdown setting can further include a noise and/or noise level which is expected to occur during an idling period. For example, the noise level can be based on a measured noise level measured in another vehicle 12. The noise level can also be based on feedback from the microphone 44 regarding the current noise level experienced within the vehicle 12 during an idling period. The noise can also include a noise recorded by the microphone 44 during an idling period which is then saved by the memory 26.

At step 125, the controller 22 and/or the stop-start mechanism 32 can further utilize feedback from the audio device 40 at step 125 to adjust the shutdown settings stored at step 110. For example, the microphone 44 can measure the noise level inside the vehicle 12 during an idling period. If the current noise level during the idling period differs from the noise level stored as a shutdown setting by the memory 26, then the current noise level can be saved as a new shutdown setting at step 110. In another example, the microphone 44 can record the noise present in the vehicle 12 during a recent idling period, and the noise can be saved by the memory 26 as an updated shutdown setting.

At step 145, the controller 22 and/or the stop-start mechanism 32 can further trigger the audio device 40 to begin generating a sound based on the shutdown setting stored at step 110. The sound can be at a level which supplements the noise caused by the vibration device 20 during the nonoperational period. For example, if operation of the engine 18 during an idling period causes a noise level of a first number of decibels inside the vehicle 12, and if operation of the vibration device 20 during a nonoperational period causes a noise level of a lesser second number of decibels inside the vehicle 12, then the audio device 40 can generate a sound at a third number of decibels to make up the difference so that there is no noticeable drop-off in noise during the nonoperational period.

At step 155, the system 10 can further utilize feedback from the microphone 44 to adjust the sound output by the speaker 42. For example, the microphone 44 can measure the noise within the vehicle 12 upon activation of the vibration device 20 during a nonoperational period. If the controller 22 determines that the measured noise does not match the shutdown setting saved at step 110, then the controller 22 can replace and/or adjust the sound output by the speaker 42 so that the noise detected by the microphone 44 during the nonoperational period matches the noise detected by the microphone during a previous idling period.

At step 175, the controller 22 and/or the stop-start mechanism 32 can trigger the audio device 40 to cease outputting sound from the speaker 42, so that the noise then audible within the vehicle 12 is due to the engine 18 and not the vibration device 20 and/or the audio device 40.

In an embodiment, the audio device 40 can be utilized at step 145 and/or at step 175 to drown out the transition from the vibrations of the engine 18 to the vibrations of the vibration device 20. In this embodiment, the audio device 40 is not used to supplement noise, but is instead used to decrease the driver's awareness of the beginning and/or end of a nonoperational period.

In an embodiment, a driver can use the user interface 46 to adjust and/or calibrate the vibration device 20 and/or the audio device 40. For example, in some embodiments, there can be a short delay between steps 140 and 145 and/or between steps 170 and 175. If the engine 18 shutting on or off or the vibration device 20 shutting on or off is perceptible to the driver at this time, then the driver can utilize the user interface 46 to adjust the delay. The driver can also use the user interface 46 to manually increase or decrease the vibrations caused by the vibration device 20. The driver can also use the user interface 46 to manually adjust the sound caused by the audio device 40. The driver can further use the user interface 46 to set or select a shutdown setting or initiate a calibration at step 110.

Figure 4A:
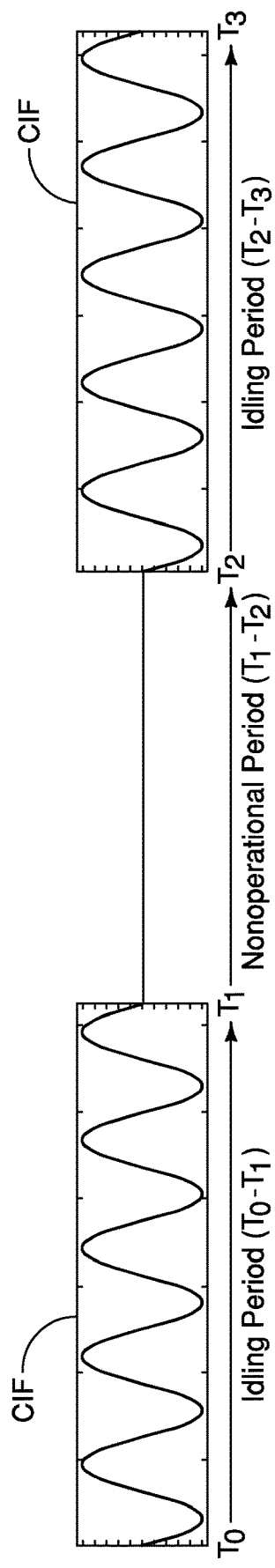
FIGS. 4A and 4B illustrate an example advantage of the system and method of FIGS. 1 to 3 in comparison to a conventional ISS system.
Figure 4B:
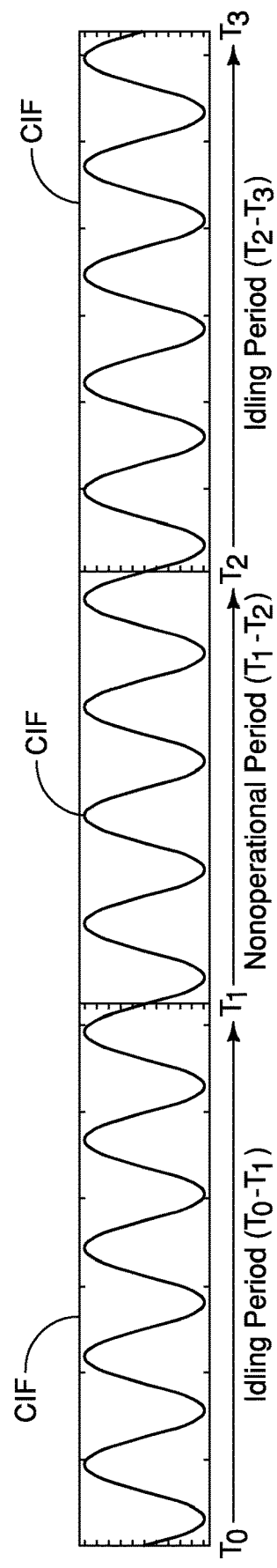

FIGS. 4A and 4B illustrate an example embodiment showing how the system 10 and method 100 described herein improve upon a conventional ISS system. FIG. 4A illustrates an example embodiment of a vehicle 12 operating without the system 10 discussed herein, while FIG. 4B illustrates an example embodiment of a vehicle 12 operating with the system 10 discussed herein and/or in accordance with the method 100 discussed herein.

In FIG. 4A, the engine 18 (e.g., a 4 cylinder engine) is idling at a number of revolutions per minute (e.g., 600 RPMs) during a first idling period between a time $T_0$ and a time $T_1$, thus causing at least one vehicle component 16 to vibrate at a current idling frequency CIF as shown. At time $T_1$, the engine 18 shuts down. Without the system 10 in place, the at least one vehicle component 16 ceases to vibrate during the nonoperational period between the time $T_1$ and a time $T_2$, thus causing a noticeable change for the driver of the vehicle 12. With the cease in vibrations, the noise level within the vehicle 12 also drops. Then, at time $T_2$, the engine 18 restarts, creating another noticeable change for the driver as the at least one vehicle component 16 again resumes to vibrate at the current idling frequency CIF during a second idling period between the time $T_2$ and a time $T_3$. With the restart of the vibrations, the noise level within the vehicle 12 also increases again. Thus, at both the time $T_1$ and the time $T_2$, there are noticeable distractions for the driver: first when the engine 18 noticeably shuts down at time $T_1$ and the vibration and/or noise levels cease, and then when the engine 18 noticeably restarts at time $T_2$ and the vibration and/or noise levels begin again.

In FIG. 4B, the engine 18 (e.g., a 4 cylinder engine) is again idling at a number of revolutions per minute (e.g., 600 RPMs) during a first idling period between a time $T_0$ and a time $T_1$, thus causing at least one vehicle component 16 to vibrate at a current idling frequency CIF as shown. At time $T_1$, the engine shuts down. With the system 10 in place, the vibration device 20 is triggered by the shutdown of the engine 18, and the at least one vehicle component 16 continues to vibrate at the current idling frequency CIF during the nonoperational period between the time $T_1$ and a time $T_2$, such that there is no noticeable indication to the driver that the engine 18 has shut down. With the continuation of the current idling frequency CIF, the noise level resulting from the vibrations also remains relatively constant. Then, at time $T_2$, the engine 18 restarts and the vibration device 20 is deactivated, such that there is no noticeable indication to the driver that the engine 18 has resumed since the at least one vehicle component 16 continues to vibrate at the current idling frequency CIF after the time $T_2$. Thus, between the time $T_0$ and the time $T_3$, the nonoperational period of the engine 18 is not noticeable to the driver of the vehicle 12.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

The term "processor" as used herein can refer to one or more processors, such as one or more special purpose processors, one or more digital signal processors, one or more microprocessors, and/or one or more other processors as known in the art.

The term "memory" as used herein can refer to any computer useable or computer readable medium or device that can contain, store, communicate, or transport any signal or information that can be used with any processor. For example, a memory can include one or more read only memory (ROM), one or more random access memory (RAM), one or more other memory, and/or combinations thereof.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for reducing driver awareness of engine stoppage by a vehicle, the system comprising:
   a stop-start mechanism in communication with an engine operable to cause movement of the vehicle and further cause vibrations to at least one vehicle component at an idling frequency while idling, the stop-start mechanism programmed to shut off the engine at a beginning of a nonoperational period and restart the engine at an end of the nonoperational period; and
   a vibration device triggered to cause the at least one vehicle component to vibrate so as to approximately match the idling frequency when the stop-start mechanism shuts off the engine at the beginning of the nonoperational period, and triggered to cease causing the at least one vehicle component to vibrate so as to approximately match the idling frequency when the stop-start mechanism restarts the engine at the end of the nonoperational period.

2. The system of claim 1, wherein the vibration device includes at least one of a piezoelectric shaker or an electrodynamic shaker.

3. The system of claim 1, wherein the vibration device is mounted on or adjacent to the at least one vehicle component.

4. The system of claim 1, wherein the at least one vehicle component includes at least one of a vehicle floor, a vehicle seat, or a vehicle seat track.

5. The system of claim 1, which includes a controller in communication with the stop-start mechanism, the controller programmed to (i) receive a first signal from the stop-start mechanism at the beginning the nonoperational period, (ii) cause the vibration device to begin vibrating the at least one vehicle component upon reception of the first signal, (iii) receive a second signal from the stop-start mechanism at the end of the nonoperational period, and (iii) cause the vibration device to cease vibrating the at least one vehicle component upon reception of the second signal.

6. The system of claim 1, wherein the vibration device is configured to cause the at least one vehicle component to vibrate at a predetermined frequency that approximately matches the idling frequency.

7. The system of claim 1, wherein the vibration device is configured to adjust vibration of the at least one vehicle component based on feedback regarding the idling frequency while the engine is idling.

8. A system for reducing driver awareness of engine stoppage by a vehicle, the engine causing vibrations to at least one vehicle component while the engine is idling, the system comprising:
   a vibration device operable to cause the at least one vehicle component to replicate the vibrations caused by the engine during nonoperation of the vehicle's engine;
   a feedback sensor configured to measure vibrations of the at least one vehicle component or the vibration device; and
   a controller programmed to (i) adjust a setting of the vibration device based on feedback from the feedback sensor so as to replicate, at a nonoperational period of the engine, the vibrations caused to the at least one vehicle component by the engine while the engine is idling, and (ii) cause the vibration device to cease replicating the vibrations to the at least one vehicle component at an end of the nonoperational period of the engine.

9. The system of claim 8, wherein the controller is programmed to automatically cause the vibration device to begin vibrating the at least one vehicle component upon reception of a signal that the engine has been stopped.

10. The system of claim 8, wherein the controller is programmed to automatically cause the vibration device to cease vibrating the at least one vehicle component upon reception of a signal that the engine has been restarted.

11. The system of claim 8, wherein the controller is programmed to cause the vibration device to continuously vibrate the at least one vehicle component between a beginning and the end of the nonoperational period of the engine.

12. The system of claim 8, wherein the at least one vehicle component vibrates at an idling frequency while the vehicle's engine is idling, and the controller is programmed to cause the vibration device to vibrate the at least one vehicle component at a predetermined frequency that approximately matches the idling frequency.

13. The system of claim 8, wherein the feedback sensor is configured to detect a current idling frequency of the at least one vehicle component while the engine is idling, and wherein the controller is programmed to use feedback from the feedback sensor to adjust a control signal to the vibration device so that the at least one vehicle component vibrates at an adjusted frequency which approximately matches the current idling frequency.

14. The system of claim 8, which includes an audio device in communication with the controller, the controller programmed to cause the audio device to emit a sound while the vibration device vibrates the at least one vehicle component during the nonoperational period of the engine.

15. A method for reducing driver awareness of engine stoppage by a vehicle, the engine causing at least one vehicle component to vibrate at an idling frequency while the engine is idling, the method comprising:

receiving a first signal that the vehicle's engine has been stopped;

causing a vibration device to vibrate the at least one vehicle component so as to approximately match the idling frequency upon reception of the first signal;

receiving a second signal that the vehicle's engine has been restarted; and causing the vibration device to cease vibrating the at least one vehicle component so as to approximately match the idling frequency upon reception of the second signal.

16. The method of claim 15, wherein receiving the first signal includes receiving the first signal from a stop-start mechanism when the engine has been shut off at a beginning of a nonoperational period, and wherein receiving the second signal includes receiving the second signal from the stop-start mechanism when the engine has been restarted at an end of the nonoperational period.

17. The method of claim 15, wherein receiving the first signal includes receiving the first signal from at least one sensor when the engine has been shut off at a beginning of a nonoperational period, and wherein receiving the second signal includes receiving the second signal from the at least one sensor when the engine has been restarted at an end of the nonoperational period.

18. The method of claim 15, which includes receiving a continuous stoppage signal during a nonoperational period of the engine, the first signal being indicated by a beginning of the continuous stoppage signal, the second signal being indicated by an end of the continuous stoppage signal.

19. The method of claim 15, wherein causing the vibration device to vibrate the at least one vehicle component so as to approximately match the idling frequency includes causing the vibration device to vibrate the at least one vehicle component at a predetermined frequency.

20. The method of claim 15, which includes
sensing the idling frequency of the at least one vehicle component while the vehicle's engine is idling, and
causing the vibration device to vibrate the at least one vehicle component at an adjusted frequency which approximately matches the idling frequency.

21. The system of claim 8, wherein the feedback from the feedback sensor is based on measured vibrations of the at least one vehicle component or the vibration device while the engine is idling.

22. The system of claim 8, wherein the feedback from the feedback sensor is based on measured vibrations of the at least one vehicle component or the vibration device during the nonoperational period.

* * * * *